United States Patent [19]

Blackwelder

[11] Patent Number: 5,322,664
[45] Date of Patent: Jun. 21, 1994

[54] CLEAR FILM EXTRUSION FROM AN ANNULAR DIE

[75] Inventor: Maurice W. Blackwelder, Bardstown, Ky.

[73] Assignee: Owens-Illinois Labels Inc., Toledo, Ohio

[21] Appl. No.: 12,498

[22] Filed: Feb. 2, 1993

[51] Int. Cl.$^5$ .................. B29C 55/26; B29C 55/28
[52] U.S. Cl. .................. 264/565; 156/86; 156/217; 264/569; 264/342 R; 425/72.1; 425/326.1
[58] Field of Search .......... 264/569, 564–567, 264/230, 342 R; 425/326.1, 72.1; 156/86, 215, 217

[56] References Cited

U.S. PATENT DOCUMENTS

| | | | |
|---|---|---|---|
| 2,832,994 | 5/1958 | Ahlich et al. | 264/569 |
| 3,243,486 | 3/1966 | Pilaro | 264/569 |
| 3,629,387 | 12/1971 | Watanabe et al. | 264/567 |
| 3,764,251 | 10/1973 | Konerman | 425/326.1 |
| 3,796,779 | 3/1974 | Greenberg . | |
| 3,936,265 | 2/1976 | McDevitt | 425/72.1 |
| 3,947,536 | 3/1976 | Horiie et al. | 264/564 |
| 3,985,931 | 10/1976 | Blackwelder . | |
| 4,049,768 | 9/1977 | Luthra . | |
| 4,424,287 | 1/1984 | Johnson et al. . | |
| 4,436,679 | 3/1984 | Winstead . | |
| 4,470,938 | 9/1984 | Johnson . | |
| 4,486,366 | 12/1984 | Reddy . | |
| 4,657,715 | 4/1987 | Myers et al. . | |
| 4,663,107 | 5/1987 | Takada et al. . | |
| 4,747,983 | 5/1988 | Colombo . | |
| 4,983,238 | 1/1991 | Yoshida et al. | 264/342 R |
| 5,082,608 | 5/1988 | Karabedian et al. . | |

FOREIGN PATENT DOCUMENTS

| | | | |
|---|---|---|---|
| 529339 | 6/1983 | Australia . | |
| 812676 | 5/1969 | Canada | 264/569 |
| 411923 | 2/1991 | European Pat. Off. . | |
| 1183229 | 12/1964 | Fed. Rep. of Germany | 425/326.1 |
| 50-3787 | 2/1975 | Japan | 425/326.1 |
| 59-49938 | 3/1984 | Japan | 264/565 |
| 59-146819 | 8/1984 | Japan | 264/290.2 |
| 60-127139 | 7/1985 | Japan | 264/230 |

*Primary Examiner*—Jeffery Thurlow

[57] ABSTRACT

A method and apparatus is provided for forming clear shrinkable film material for use as labels on containers. A blend of general purpose polystryene and styrene-butadiene or styrene butyl acrylate is extruded from an annular extruder die orifice to form a frustoconical tube which is stretched before cooling air is applied to form a clear film that has machine direction orientation and cross direction orientation that can be used as a shrinkable label on containers. As the tube is extruded, it is shielded from cooling air which is applied downstream from the extruder die orifice. The apparatus shields the hot annular extruded material adjacent the die orifice. The air is supplied downstream from an annular air orifice which is designed with a taper that allows ambient air to be freely drawn in and eliminates what would be a negative pressure zone immediately downstream of the air orifice while eliminating air turbulence and improving cooling.

6 Claims, 2 Drawing Sheets

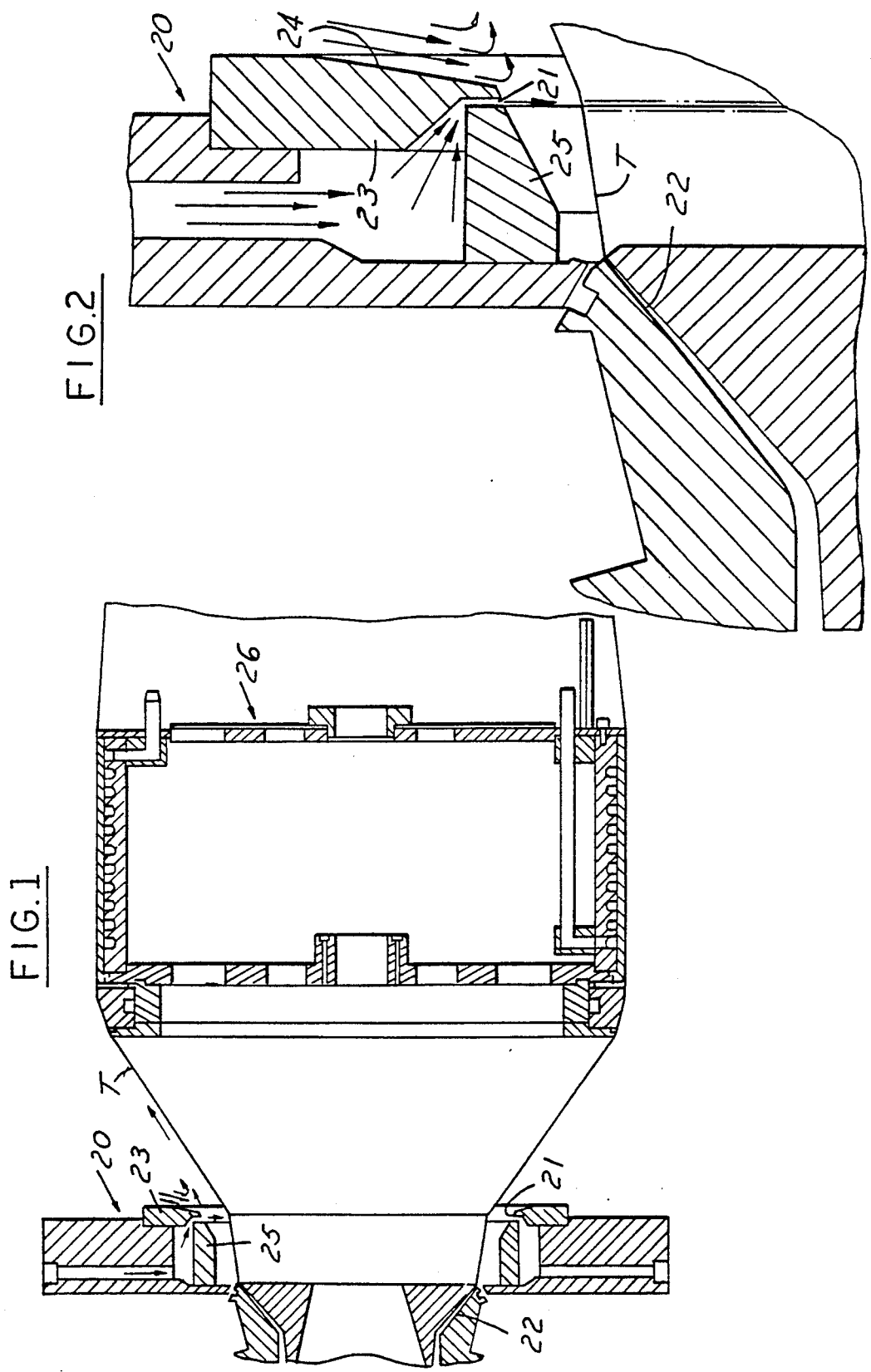

CLEAR FILM EXTRUSION FROM AN ANNULAR DIE

This invention relates to the extrusion of clear film.

BACKGROUND OF THE INVENTION

Clear non-cellular films produced from blends of general purpose (crystal) polystyrene and styrene-butadiene block copolymers or styrene butyl acrylate copolymers have in the past been processed by flat die casting onto polished chilled rollers. Such films have good clarity but are typically low in machine direction orientation with little or no cross direction orientation unless stretching action is induced downstream.

Machine and cross direction orientation can be imparted to film without a secondary process by stretching by extrusion through an annular die, forming a frustoconical tubular web and drawing the frustoconical web over an internal cooling mandrel. The formed tubular web is slit on two sides at the end of the mandrel resulting in two continuous webs which are wound simultaneously onto two rolls.

While with this method desired improvements are realized in cross and machine direction orientation, a significant degree of clarity is lost as can be measured by haze transmission.

The selection of the grade of crystal polystyrene to blend with the styrene-butadiene or styrene butyl acrylate copolymers is a factor in the degree of clarity achieved. However, the optimum selection from the commercial grades available fails to deliver the degree of clarity achievable with the flat die casting extrusion technique.

Among the objectives of the present invention are to provide a method and apparatus for extruding clear film utilizing an annular die which produces clear film with crystal clear clarity equal to or better than that heretofore produced in flat die casting onto polished chilled rollers; which film is oriented; which maintains the improvement in machine direction (MD) and cross direction (CD) orientation and reduces the importance of the selection in grade of crystal polystyrene; and which method and apparatus can be readily applied to conventional annular dies.

In accordance with the invention, a method and apparatus is provided for forming clear shrinkable film material from an annular die for use as labels on containers. A blend of general purpose polystryene and styrene-butadiene or styrene butyl acrylate is extruded from an annular extruder die orifice to form a frustoconical tube which is stretched before cooling air is applied to form a clear film that has machine direction orientation and cross direction orientation that can be used as a shrinkable label on containers. As the tube is extruded, it is shielded from cooling air which is applied downstream from the extruder die orifice. The apparatus shields the hot annular extruded material adjacent the die orifice. The air is supplied downstream from an annular air orifice which is designed with a taper that allows ambient air to be freely drawn in and eliminates what would be a negative pressure zone immediately downstream of the air orifice while eliminating air turbulence and improving cooling.

DESCRIPTION OF THE DRAWINGS

FIG. 1 is a partly diagrammatic view of an apparatus embodying the invention.

FIG. 2 is a partly diagrammatic view of an enlarged scale of a portion of the apparatus shown in FIG. 1.

DESCRIPTION

Figure 4:
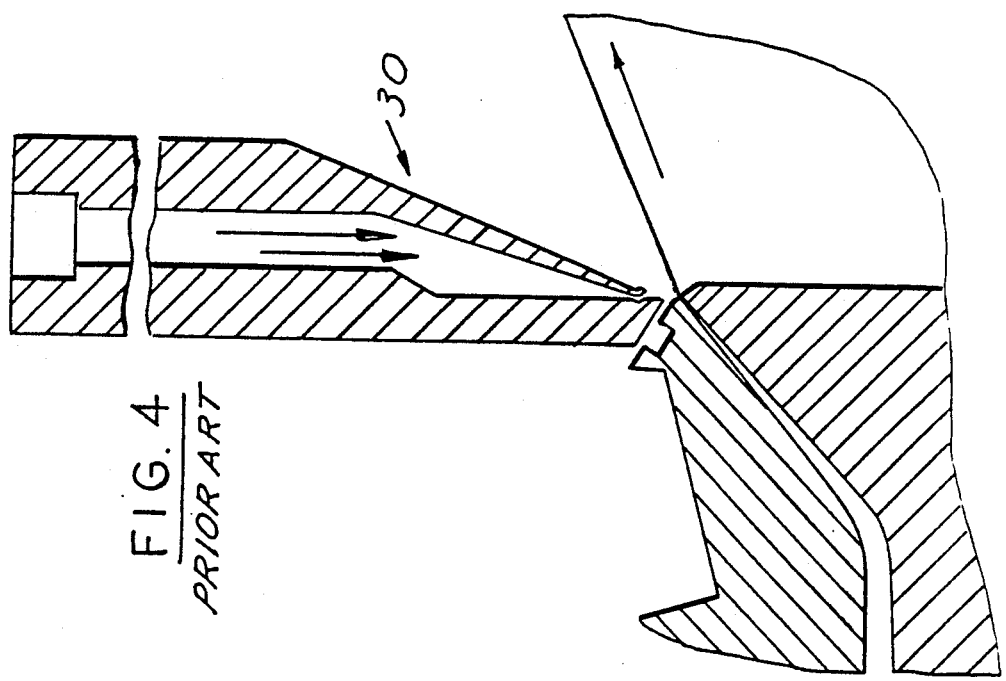
FIG. 4 is a partly diagrammatic view on an enlarged scale of a portion of the prior art apparatus shown in FIG. 3.

In accordance with the invention as shown in FIGS. 1 and 2, an air ring 20 is positioned to define an orifice 21 downstream from annular extruder die orifice 22 whereby polystyrene is extruded as a tubular cylindrical web T and is stretched longitudinally while hot before cooling air is applied against the outer surface of the tubular film T at substantially a right angle and the tube configuration becomes frustoconical. It has been found that a time delay to allow the web to be stretched hot at extrudate temperatures of approximately 325°–350° F. prior to the application of cooling air, dramatically improves the film clarity. The outer lip 23 of the air ring 20 adjacent orifice 21 is designed with a taper as at 24 which allows ambient air to be freely drawn in and eliminates what would be a negative pressure zone immediately downstream of the air ring orifice 21, as shown by the arrows in FIG. 2. This taper 24 thus eliminates air turbulence and improves cooling.

The air ring 20 includes a portion 25 which extends longitudinally in the direction of movement of web T shields the hot extrudate from any cooling until it has been stretched using pull rolls downstream to provide the desired degree of machine direction (MD) and cross direction orientation.

A cooling mandrel 26 is provided downstream of the cooling ring 20 for cooling the internal surface of the tubular film T.

The technique developed in the present invention provides a clear polystyrene film which includes an improvement in machine direction (MD) and cross direction (CD) orientation and reduces the importance of the selection in grade of crystal polystyrene.

Figure 3:
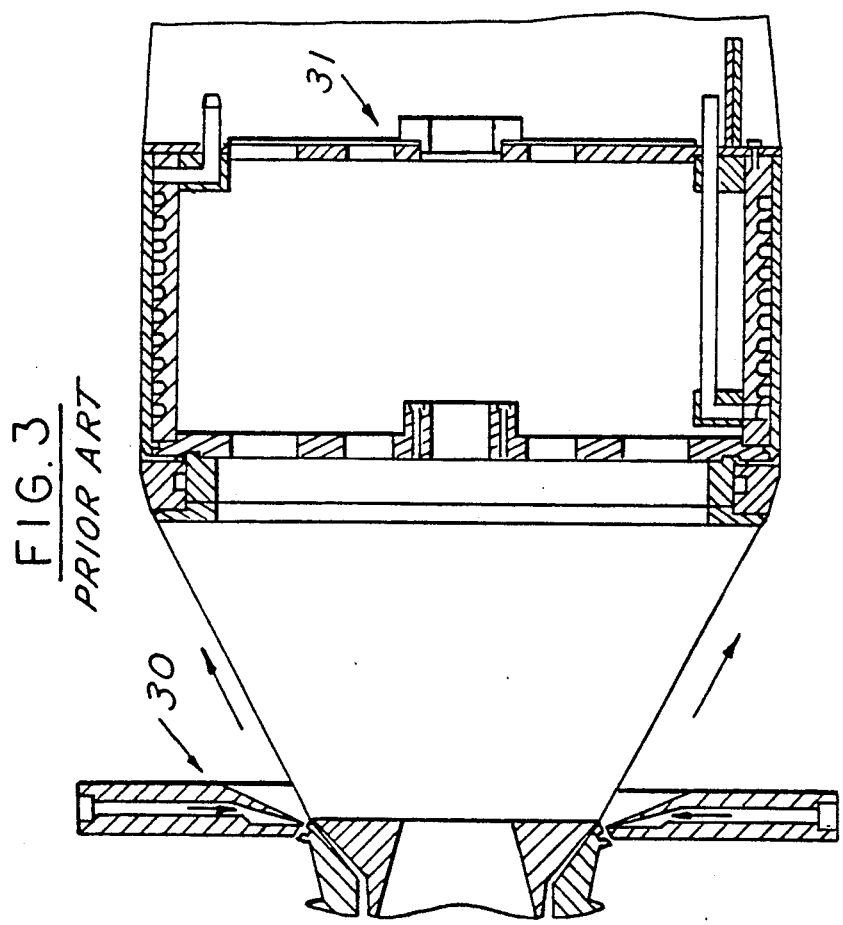
FIG. 3 is a partly diagrammatic view of a prior art apparatus.

Referring to FIGS. 3 and 4, in typical annular die extrusion processes, one phase of cooling the tubular web is done by an outer air ring 30 mounted with an orifice to blow cooling air onto the web immediately upon exit from the die lip and cooling mandrel 31 downstream. With clear film this cooling application imparts an immediate development of haze.

The polystyrene preferably comprises a blend of crystal polystyrene and a block polymer such as styrene butadiene copolymer or a styrene butyl acrylate copolymer.

In a typical example, the composition of the extrudate consisted of a blend of 60 parts Dow GPPS 675 (crystal polystyrene) and 40 parts Phillips K-Resin (styrene butadiene copolymer). Ditridecyl Adipate (DTDA) was directly injected into the molten resin at a rate of 2% by weight during extrusion. When extruded at a temperature of 345° F. and circumferentially stretched at a ratio of 2.04 to 1.0 (11.0" Die/22.4" Mandrel) and at a linear rate of 140 FPM, the resulting 2 mil film had the following properties:

| | TENSILE PROPERTIES | | | | |
|---|---|---|---|---|---|
| | Lbs. Yield | Lbs. Break | PSI Yield | PSI Break | % Elongation |
| Machine | 7.4 | 7.3 | 7283 | 7221 | 91.3 |

| | -continued | | | | |
|---|---|---|---|---|---|
| Direction | | | | | |
| Cross Direction | 5.5 | 4.9 | 5520 | 4878 | 11.7 |

SHRINKAGE (ORIENTATION) PROPERTIES
Typical Value Ranges

| Temperature | Machine Direction | Cross Direction |
|---|---|---|
| 210° F. | 12–18% | 5–8% |
| 220° F. | 34–40% | 9–12% |
| 230° F. | 50–55% | 12–15% |

Shrinkage values may be changed by the addition of more or less ditridecyl adipate. Examples are shown below:

| Temperature | Machine Direction | Cross Direction |
|---|---|---|
| Reduction to 1.0% DTDA Percent Shrinkage | | |
| 210° F. | 8–10% | 2–4% |
| 220° F. | 25–30% | 5–8% |
| Increase to 3.0% DTDA Percent Shrinkage | | |
| 210° F. | 25–30% | 3–5% |
| 220° F. | 45–50% | 6–12% |

The properties of the film are essentially unchanged by the revision in the air cooling and use of the technique to stretch the material in a hot state prior to the application of cooling. The significant change is a dramatic change in the resultant clarity as measured by haze transmittance (ASTM D-1003-61). When using the preferred crystal polystyrenes containing no mineral oil and having melt flow values around 8-10 (GMS/10 min, condition G) with the typical (original) annular die process, the resultant haze percent values on a 2 mil film were in excess of 10. With the subject apparatus and hot stretch techniques the 2 mil film clarity improved to the extent that haze percent values of less than 5 were achieved.

Styrene-butadiene polymers are thermoplastic block copolymers containing over 50% styrene. The rubbery butadiene segment of the copolymer is structured to be transparent while imparting toughness and impact resistance. Current U.S. suppliers of styrene-butadiene copolymers, and their registered trade names include Fina Oil and Chemical Company (Finaclear), Firestone (Stereon) and Phillips 66 (K-Resin).

Generally, for use in making clear film in the prior art flat die casting, the recommended grades of crystal general purpose polystyrene to blend with styrene-butadiene block copolymers would be ones with high melt flow rates 15–20 (GMS/10 min, condition G), low molecular weights (175,000–200,000) and with low vicat softening temperatures (195° F.–205° F.). Examples, of grades of this nature would be Chevron 3710, Polysar 555, Dow 615 and Huntsman 208. Typically, a crystal polystyrene having a high melt flow and low vicat softening point as illustrated by the indicated ranges contain mineral oil at a level of 2.0 to 4.0%.

In order to extrude a clear film using polystyrene blended with a styrene-butadiene copolymer and an annular die, a highly polished mandrel with a smooth coating such as nickel/chrome is required. The styrene/styrene-butadiene material is relatively soft at elevated temperatures and is highly subject to scratching when drawn with cooling over the mandrel surface.

When extruding resins containing mineral oil, a significant portion of the mineral oil will volatilize from the extrudate upon exit from the extrusion die. The mineral oil vapor will then condense onto the surface of the cooling mandrel in an annular die process which typically would be controlled at 150° F. The surface of the mandrel hence becomes highly lubricated by the mineral oil reducing and varying the friction of pull between the web(s) and the mandrel and creating a variable tension of the web from the mandrel to the pull rollers. This variability in tension rate can become severe causing an obvious pulsing in the speed of web travel with negative effects on caliper and sheet properties. Consequently, all grades of polystyrene containing mineral oil were eliminated for consideration for use in this application.

Crystal polystyrene grades having similar values for molecular weight as those previously cited (175,000–200,000) which do not contain mineral oil have melt flow rates around 8–10 (GMS/10 min, condition G) with vicat softening points around 220°–225° F. Examples of such grades include Chevron 3200, Huntsman 738 and Dow 675. Experience has demonstrated that crystal polystyrene grades of this type will create a haze problem when blended with a styrene-butadiene block copolymer and extruded using conventional annular die type process. Use of polystyrene grades of this type would, however, be preferred because they do not contain mineral oil which creates web tension problems.

In order to employ crystal polystyrenes which do not contain mineral oil and achieve film clarity with low haze values, it was found necessary to stretch the tubular extrudate in a linear direction (commonly called the machine direction) prior to the application of surface cooling air. Accordingly, a circular baffle was incorporated as a component of the outer cooling air ring whereby the tubular extrudate could be temporarily shielded to maintain a heated state for stretching prior to the application of cooling air. The design of the baffle and the down-stream location of the orifice for the flow of cooling air allows the tubular extrudate to stretch in a linear direction while essentially maintaining the same diameter as the die through this stretching phase. After this brief delay for stretching the extrudate tube is drawn under the outside air cooling orifice and begins its radial expansion which increases the tubular extrudate diameter to equal the diameter of the cooling mandrel. The initial hot stretching dramatically increases the clarity (reduces haze) when using crystal polystyrenes of the type with melt flows 8–10 GMS/10 min. and containing no mineral oil. The radial stretching after the application of cooling air imparts cross directional orientation while the linear stretching (draw) imparts a machine directional orientation. The amount of MD and CD orientation imparted as illustrated herein by the reported property values, is preferred in film made for the end use application of shrinkable label material for containers such as glass bottles. In such an application, the film would be wrapped with the machine direction positioned circumferentially along the bottle and the cross direction positioned axially of the bottle. A seam is made by overlapping the ends of the label and securing by bonding such as to form a sleeve by heat sealing. The bottle together with the applied label sleeve is then exposed to sufficient heat to cause the formed sleeve to shrink and conform to the bottle contour. This hence illustrates the need for higher shrinkage to occur in the machine direction with less shrinkage needed in the cross direction.

It can thus be seen that there has been provided a method and apparatus for extruding clear film utilizing an annular die which produces clear film with crystal clear clarity equal to or better than that heretofore produced in flat die casting onto polished chilled rollers; which film is oriented; which maintains the improvement in machine direction (MD) and cross direction (CD) orientation and reduces the importance of the selection in grade of crystal polystyrene; and which method and apparatus can be readily applied to conventional annular dies.

I claim:

1. A method of making a clear single layer polystyrene non-foam film for use as a label which comprises extruding a blend of crystal polystyrene containing no mineral oil and a block polymer from an annular orifice in tubular frustoconical form from an annular die to form tubular film, said crystal polystyrene having flow rates of about 8-10 (GMS/10 min. condition G) and vicat softening temperatures of about 220° F. to 225° F., initially stretching the tubular film axially and transversely while it is hot from the die to provide a machine direction and cross direction orientation, thereafter directing cooling air from an annular orifice against the exterior of the tubular film downstream of said annular orifice, shielding the tubular film from said cooling air while it is being initially stretched while substantially maintaining the diameter of the tube the same, and thereafter expanding and stretching the tubular film downstream of said step of directing cooling air to provide machine direction and cross direction orientation such that the material can be used as a shrinkable label, thereafter passing the tubular film over a highly polished cooling mandrel having a smooth coating to cool the interior surface of said tubular form such that the film has a clarity as measured by haze percentage of less than 5.

2. The method set forth in claim 1 wherein said step of cooling comprises directing air from said annular orifice at a generally right angle against said tubular film.

3. The method set forth in claim 2 wherein said step of directing cooling air comprises providing said cooling air orifice with a tapered lip to cause the cooling air to move downstream along the outer surface of the tubular film.

4. The method set forth in any one of claims 2 and 3 including the step of cutting a label from a portion of the film such that the label has a machine direction orientation and a cross direction, wrapping a label of said product about a container with the machine direction positioned circumferentially around a container and the cross direction positioned axially of the container, overlapping the edge, heat sealing the overlapped edges to form a sleeve and applying heat to the sleeve to shrink the sleeve about the contour of the container.

5. An apparatus for making a clear polystyrene film which comprises means for extruding polystyrene in tubular form from an annular die to form tubular film, means for partially stretching the tubular film axially and transversely while it is hot from the die to provide machine direction and cross direction orientation, means positioned downstream from said annular die for thereafter directing cooling air from an annular orifice against the exterior of the tubular film, means for shielding the tubular film from cooling air while it is being partially stretched, and cooling mandrel means for cooling the interior surface of the film downstream of said cooling orifice, said cooling mandrel means having a highly polished surface.

6. The apparatus set forth in claim 5 wherein said means for directing cooling air orifice includes means for directing air at a generally right angle against said tubular film.

* * * * *